May 12, 1970     J. A. BLOICE     3,512,155
DOPPLER APPARATUS

Filed July 1, 1968     4 Sheets-Sheet 1

INVENTOR
JOHN ANTHONY BLOICE
BY Glascock, Downing &
Seebold ATTORNEYS

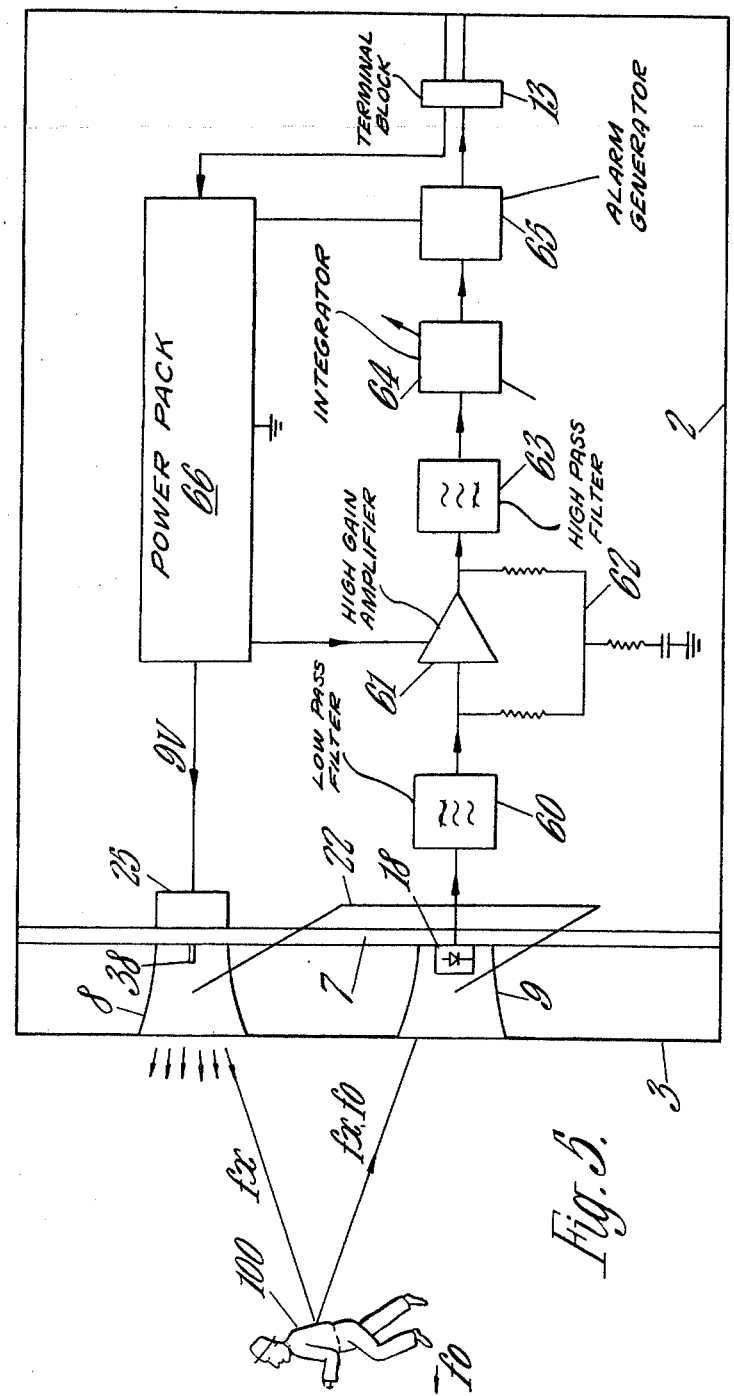

United States Patent Office 3,512,155
Patented May 12, 1970

3,512,155
DOPPLER APPARATUS
John Anthony Bloice, London, England, assignor to Memco Limited, Isleworth, Middlesex, England, a British company
Filed July 1, 1968, Ser. No. 741,736
Claims priority, application Great Britain, July 3, 1967, 30,514/67
Int. Cl. G01s 9/42; G08b 13/00
U.S. Cl. 343—8                       9 Claims

ABSTRACT OF THE DISCLOSURE

A Doppler transmitter and receiver are disclosed in order to detect movement. Separate transmitter and receiver aerials are placed alongside one another with a coaxial cable connecting the two aerials together in order to maintain the mixer diode, which is located inside the receiver aerial, in a conductive condition by a portion of the output signal of the transmitter aerial. The mixer diode detects relatively small reflected signals from a moving burglar within the system range and the output of the mixer diode is filtered to provide Doppler frequencies which are integrated over a period of time to provide a mean signal level which, if it exceeds a predetermined threshold level, triggers an alarm to signify the detection of the burglar.

---

Figure 1:
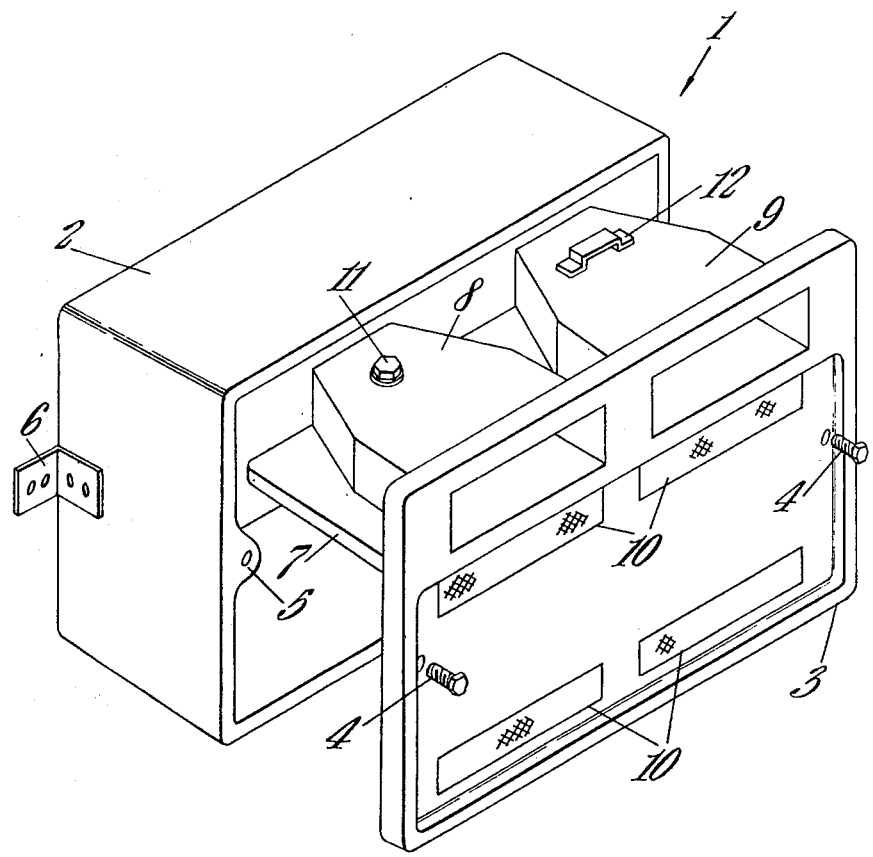

This invention relates to apparatus for detecting movement and, more specifically, is concerned with an electronic microwave apparatus which operates on the Doppler effect.

Electronic apparatus making use of the Doppler effect is now in common use in radar systems and navigational aids. The underlying principle is that stationary objects will reflect an incident microwave at the same frequency as it is transmitted, whereas a moving object will cause the reflected wave to have a slightly different frequency provided that the object is moving either towards or away from the transmitter. The difference in frequency between the transmitted and reflected waves is known as the Doppler frequency and may be used in conjunction with an exceedingly accurate timing instrument to provide the range, velocity and bearing of the moving object relative to the transmitter. Naturally if the transmitter is moving then the Doppler effect can be used to provide an accurate measure of the transmitter's velocity by the reflection of the microwave beam from the stationary objects.

The sophistication of apparatus currently utilising the Doppler principle results in it being expensive and having few if any applications outside of defence requirements and costly civilian navigational equipment such as is carried by modern passenger-carrying airliners.

An object of this invention is the provision of relatively inexpensive apparatus for detecting movement or a pre-determined velocity by Doppler effect.

In accordance with the present invention electronic apparatus for detecting movement by the Doppler effect comprises: an X-band transmitter feeding a microwave launching aerial shaped to provide the desired radiation pattern; an X-band receiver aerial separate from the launching aerial and provided with a diode on which the reflected radiation picked up by the receiver aerial is incident; means for feeding a sufficient part of the transmitted microwave power from the transmitter to the diode to drive it into conduction so that it behaves as a combined mixer and detector for incoming radiation at different frequencies; a band-pass amplifier connected to receive the diode output and passing only a selected range of Doppler frequencies produced in the output of the diode; and circuitry connected to the amplifier and providing two signals respectively significant of the presence or absence of Doppler frequencies within the selected range and thus usable to indicate movement towards and away from the transmitter of a reflecting object lying in the radiation pattern monitored by the receiver.

The apparatus of the invention can be cheaply constructed as no sophisticated microwave plumbing is necessary. It will be appreciated that although the apparatus responds to movements in the radiation pattern it is also capable of signifying the velocity of the movements being above or beneath a particular value. However, most civilian applications require movements alone to be sensed in a particular place and the invention is able to provide such apparatus at relatively low cost as X-band radiation can be satisfactorily beamed.

One object of the use of the apparatus of the invention lies in the security field. The apparatus may be mounted to provide a radiation curtain across a safe or across the entrance to a room to detect introducers. Although, in theory, the apparatus will not respond to a reflecting object moving at right angles to the radiation transmission, in practice, the relative movement of a reflecting part of a person intercepting the radiation curtain may be made sufficient to operate the apparatus by suitably choosing the lower frequency of the selected range. The diode frequencies transmitted by the band-pass amplifier in the case of apparatus providing an intruder-sensing screen, preferably lie within the range of 1–50 cycles per second. The lower cut-off frequency prevents the apparatus from responding to electrical fluctuations in the supply, and the upper cut-off frequency prevents the apparatus from responding to fast moving objects which may cross the radiation curtain, such as a flying insect.

The launcher conveniently comprises a horn which is shaped to provide a beam of radiation having the desired pattern. A second horn arranged beside the launching horn and similarly dimensioned and orientated may be used to feed reflected radiation to the receiver which suitably is mounted in the same box as the transmitter. The receiver diode may then be mounted at the focus of the receiver horn. The use of a two-horn system instead of a single aerial for both transmitter and receiver as is customary with Doppler radar sets, results in substantial advantages. The use of two horns obviates the need for an elaborate directional coupler or circulator which is inevitably an expensive piece of microwave plumbing. Also, unless the coupler or circulator is very carefully made, there will be a loss of some of the transmitted signal into the receiver circuit and conversely some of the incoming reflected signal will be uselessly directed into the transmitter circuit. The use of two separate aerials avoids this difficulty.

The X-band range of frequencies has the advantage that it is greatly attenuated by most objects so there is little risk of radiation escaping from a closed room containing the apparatus. The preferred frequency of the apparatus is 10,500 megacycles per second, plus or minus 24 megacycles per second. This frequency is attenuated by a sheet of cardboard so that the apparatus is insensitive to spurious external interference which might otherwise penetrate the room where the apparatus is located.

The transmitter oscillator preferably comprises a Gunn diode suitably mounted so that its output probe projects into the rear of the microwave launching horn. In this way a direct coupling of the microwave energy into the launcher is obtained. Alternatively, the transmitter may use an oscillator such as a klystron valve instead of a Gunn diode. In this case the klystron output is preferably fed into the launcher by way of a probe having one end coupled into the output cavity of the klystron and the other end protruding into the launcher. The mismatch and standing waves produced by such an arrangement is perfectly acceptable as the apparatus is only called upon to provide a YES/NO response at a short range for which an output power of only 20 milliwatts is normally adequate.

Advantageously the circuitry connected to the bandpass amplifier includes an integrator. This may be set to trigger the generation of a signal, signifying the presence of an intruder, when a received signal integrated over a predetermined period produces a mean signal level which exceeds a preset adjustable threshold value. In this way spurious signals of short duration which may result in false detection of an intruder do not influence the apparatus as they do not pass the integrator.

In this connection the importance of the separate transmitter and receiver aerials should be borne in mind. Were a single aerial used for both transmitter and receiver, an insect moving across the aerial aperture or, perhaps, moving across a front cover, will produce a very strong signal as it is both very close and within the field of both the transmitter and receiver aerials. As the invention utilises separate transmitter and receiver aerials it is not possible for an insect or small object to be within the field of both aerials simultaneously until the beams converge, and at this distance the insect is far enough away not to be detected.

Figure 2:
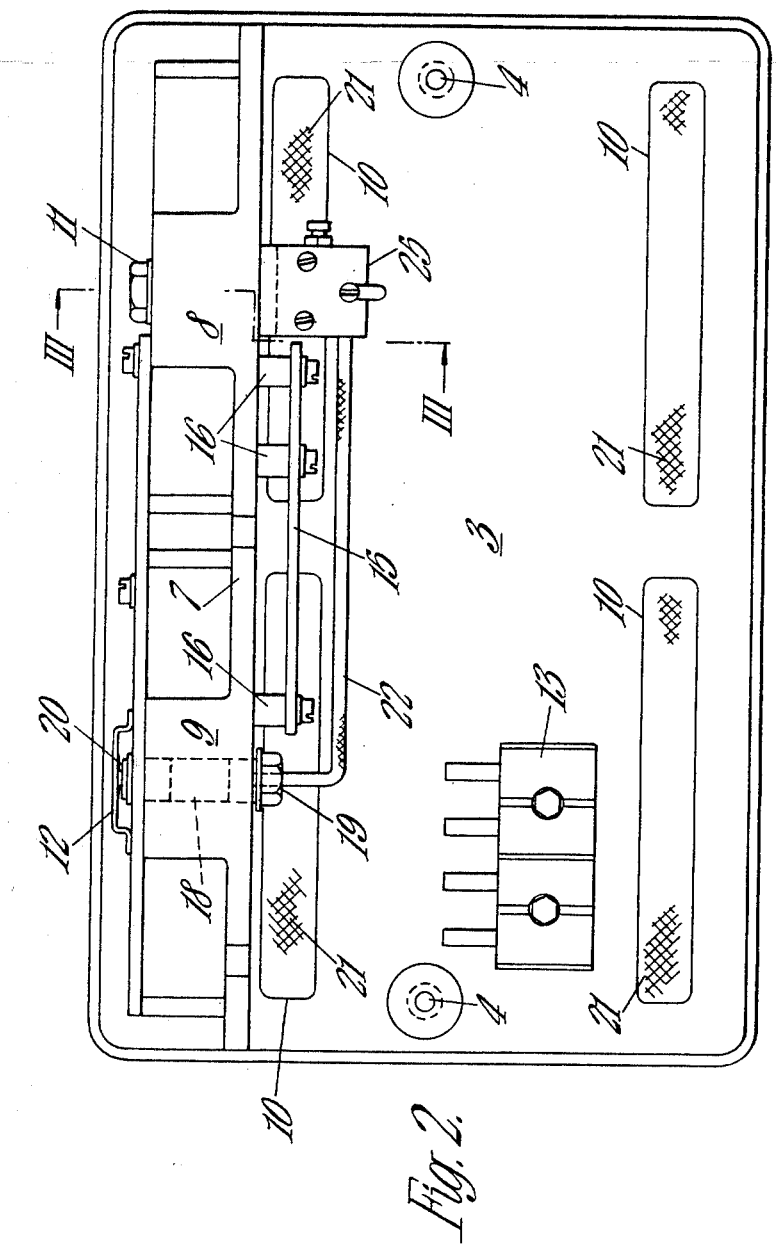
Figure 3:
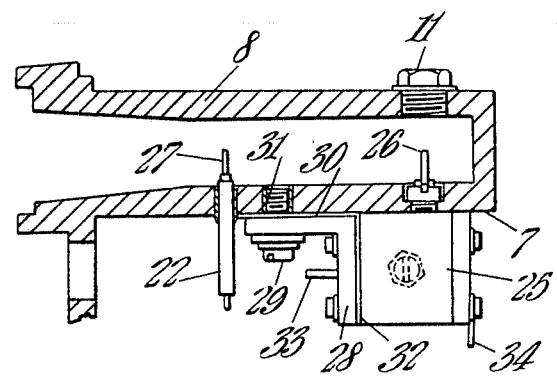
Figure 4:
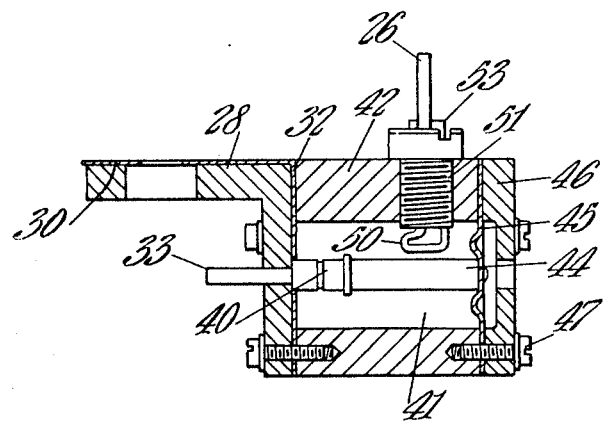

The invention will now be described in more detail, by way of examples, with reference to the accompanying drawings, in which:

FIG. 1 is an exploded view of a burglar alarm casing;
FIG. 2 is a rear view of a front cover of the casing;
FIG. 3 is a section through FIG. 2 taken on the line and in the direction indicated by the arrows III—III;
FIG. 4 is a section through a Gunn diode oscillator assembly shown in elevation in FIG. 3; and
FIG. 5 is a synoptic diagram of principal parts of the alarm circuit.

Turning first to FIG. 1 a burglar alarm is mounted inside a casing shown generally at 1 and comprising a cast aluminum box 2 having an open front which is normally closed by a front cover 3 held in place by self-locking bolts 4 which pass through holes in the sides of the front cover and are threaded into lugs 5 provided on the inside of the box 2. A wall bracket 6 enables the casing to be mounted at a position at which it provides a radiation screen across the path of access to an object such as a safe which is to be screened by radiation from the burglar alarm.

The front cover 3 is integrally formed with a rearwardly extending horizontal shelf 7 on which are cast a pair of radiation horns 8 and 9 of which horn 8 provides a radiation launching horn for an X-band transmitter while horn 9 provides a receiver aerial for an X-band receiver housed within the box 2 but not shown. As is well known, X-band radiation covers the frequency spectrum 8,000 to 12,000 megacycles per second.

The horns 8, 9, shelf 7 and the front cover 3 are integrally formed from an aluminum casting which is provided with openings 10 for the convection circulation of air through the box 2 to maintain the electrical components within it cool. A bolt 11 is provided in the top rear portion of the launching horn 8 and which may be removed to enable adjustment to be made to the transmitter aerial mounted as a quarter-wave stub (not shown) at approximately the focal point of the launching horn 8 as is customary. The horn 9 is also provided with an opening through its upper surface and which is covered by a bracket 12 having a spring for holding a receiver diode (not shown in FIG. 1) in place inside the receiver horn at its focal point.

The rear surface of the front cover 3 is clearly shown in FIG. 2. It has mounted on it all of the transmitter and receiver circuitry and is provided with a terminal block 13 for connecting power supplies to the circuitry, such supplies being fed through an opening (not shown) in the back of the box 2 by way of a suitably armoured cable. The terminal block 13 also provides connections for leads which are to operate a remote alarm.

A mounting board 15 is bolted to pillars 16 extending away from the underside of the shelf 7 and has mounted on it the electronic components of the receiver apart from a mixer diode 18 shown in dotted outline and mounted inside the receiver horn 9 at its focal point. The receiver diode is inserted into the horn from the underside of the shelf 7 by way of a bolt hole which is then closed by a bolt 19 which presses the diode 18 resiliently upwards to make good electrical contact at one end with a resilient spring 20 provided in the underside of the bracket 12.

As clearly shown in FIG. 2 the ventilation slots 10 are protected by armoured grids 21. A short length of coaxial cable 22 is looped beneath the shelf 7 and its opposite end portions respectively project upwardly into the launching horn 8 and the transmitter horn 9 to couple some of the X-band radiation directly into the receiver to maintain the diode 18 in a conducting, or "pumped" condition.

FIG. 3 is a cross-section through the launching horn. The X-band radiation is generated in a Gunn diode oscillator assembly 25 and is coupled into the launching horn 8 through a quarter-wave stub 26. Positioned between the stub 26 and the mouth of the launching horn 8 is a projecting portion 27 of a core of the coaxial cable 22 which feeds some of the radiation directly to the receiver horn. The Gunn diode assembly 25 is held in place by an aluminium angle bracket 28 which is bolted at 29 to the underside of the shelf 7. A thin layer of insulating PTFE material 30 electrically insulates the bracket 28 from the aluminum casting of the shelf 7 and a collar of insulating PTFE material 31 surrounds the threaded end of the bolt 29. A second thin layer of insulating material 32 separates the bracket 28 from the remainder of the Gunn diode assembly apart from the positive terminal 33 of the Gunn diode which projects through the bracket 28 to enable a 9 volt positive electrical supply to be connected to it. The other terminal of the Gunn diode is provided by an earthed lead 34.

FIG. 4 shows the Gunn diode assembly in more detail. The Gunn diode itself is referenced 40 and is mounted in a resonant cavity 41 formed within a housing 42 made of aluminium and bolted to the bracket 28. The diode 40 is sandwiched between the positive terminal 33 and a copper bar 44 providing the negative terminal. The end of the bar 44 remote from the Gunn diode 40 is bolted to the centre of a flexible diaphragm 45 made of resilient copper and clamped between an end plate 46 and the housing 42 to which the end plate is bolted at 47. The diaphragm allows thermal expansion and contraction of parts associated with the Gunn diode 40 so that it is not unduly stressed as a result of thermal expansions and contractions of the parts associated with it.

The oscillatory cavity 41 of the Gunn diode is tapped by a loop 50 which passes through a nylon bolt 51 to provide with its other end the quarter-wave stub 26 transmitting radiation into the launcher 8. The bolt 51 is internally threaded and has screwed into a screw 53 which may be turned to vary the orientation of the coupling loop 50 in the oscillatory cavity 41 for optimum radiation transmission.

The electronic circuitry associated with the burglar alarm is shown in block schematic form in FIG. 5.

Incoming radiation received by the aerial 9 is detected by the mixer diode 18 which is maintained conductive by radiation transmitted directly from the launching aerial 8 by way of the coaxial loop 22. The output from the diode 18 is passed to a low pass filter 60 which transmits frequencies of the order of 50 cycles and less to a high gain amplifier 61 having a degenerative feedback loop 62 feeding back to the input terminal of the amplifier the higher frequencies which are therefore effectively suppressed at the output terminal. The lower frequencies up to about 50 or 60 cycles are then fed through a high pass filter 63 which cuts out Doppler frequencies of less than 1 cycle per second. The output from the high pass filter 63 is fed to an integrator 64 which triggers an alarm generator 65 if the Doppler frequencies lying within the range 1–50 cycles per second are maintained for a predetermined period of say 3 seconds.

A power pack 66 provides electrical supplies to the Gunn diode, the alarm generator and the amplifier 61. The alarm generator is so arranged that in the event of the electrical supply circuit to the apparatus being disconnected, an alarm sounds automatically.

The above described apparatus operates in the following manner.

When it is switched on the Gunn oscillator produces X-band radiation at 10,500 megacycles per second with a power output of about 20 milliwatts. This radiation is transmitted by the launcher 8 in the form of a thin wide curtain of radiation which completely spans the only path of access to the safe to be protected.

A portion of the radiation transmitted into the launcher 8 is bled off by the coaxial cable 22 and fed directly into the receiver 9 where it mixes with incoming reflected radiation at the same frequency and originating from stationary objects in the radiation pattern of the transmitter.

Under normal conditions the reflected energy received would be inadequate to cause the diode 18 to conduct unless the energy output of the transmitter was relatively high. However, the direct feed of radiated energy through the coaxial cable 22 to the receiver 9 provides a continuous intensity of radiation in the receiver launcher 9 to maintain the diode 18 in the conductive condition. This condition of a mixer diode is commonly known as a "pumped" condition.

If there is no moving object in the path of radiation reflected from the transmitter, the frequencies received by the diode 18 correspond to those transmitted by the Gunn diode and they are all stopped by the low pass filter 60. No signal therefore reaches the high pass amplifier and the alarm generator remains quiescent.

In the event of an object, pictorially represented at 100, moving into the radiation pattern of the transmitter 8, it will reflect a portion of the radiation into the receiver 9 at a Doppler frequency equal to $fx-fo$ where $fx$ is the X-band radiation transmitted by the Gunn oscillator and $fo$ is the relative movement of the object 100 towards or away from the receiver 9. At the frequency of X-band radiation movement of the object 100 at a speed of 1 mile per hour will produce a 30 cycle per second change in the reflected frequency received by the receiver 9. This Doppler frequency forms a very small part indeed of the received radiation but is nevertheless detected by the mixer 18 as it is already in the conductive condition. The Doppler frequency is fed with the other frequencies into the high pass filter and, as its frequency is less than the 50 cycle upper limit of the high pass filter, it is transmitted to the amplifier 61.

The amplifier 61 has a high gain and selectively amplifiers frequencies beneath 50 cycles so that an adequately strong output signal corresponding to 30 cycles per second is obtained at the output terminal of the amplifier 61. This signal is not suppressed by the degenerative feedback loop 62 as it is by-passed by the capacitive earth connection from the feedback loop 62.

It will be appreciated that in addition to the frequency of 30 cycles per second appearing at the output terminal of the amplifier 61, lesser frequencies will also appear as different parts of the object 100 will almost certainly move at different relative velocities at different times. The high pass amplifier 63 prevents frequencies of less than 1 cycle per second being transmitted to the integrator circuit 63 so that slow cyclically occurring changes in the electrical supply to the apparatus and which have frequencies of less than 1 cycle per second do not result in the false detection of an intruder.

The integrator 64 integrates the output of the high pass filter 63. The frequencies received by the integrator 64 have approximately the same amplitude as the result of the high gain of the amplifier 61 and an amplitude limiting circuit associated with the integrator 64. The output level of the integrator 64 is therefore a function of the time for which Doppler frequencies lying between 1 and 40 cycles are received. This time may be set as desired so that the output level fed to the alarm generator 65 only exceeds a predetermined threshold level if the Doppler frequencies are continuously received for a period of, say, 1 second. As the alarm generator 65 provides a simple YES/NO response it may be simply constructed.

The above described apparatus has many advantages. It is simple in construction and yet is able to utilise Doppler frequencies without the need for costly time measuring circuitry. It is reliable in operation and is insensitive to relatively fast moving objects such as flying insects which may from time to time pass through the radiation pattern. It will be appreciated that the velocity of a flying insect is very much greater than the velocity of an intruder and its area is very much less. By suitably adjusting the amplification obtained by the high gain amplifier 61, the frequency characteristics of the filters 60 and 63 and the feedback loop 62, and the time setting of the integrator 64, the apparatus may be made totally insensitive to relatively small objects while maintaining a very high degree of sensitivity indeed, to relatively large objects moving at the speeds which an intruder may be expected to move at.

In a modification of the above apparatus the transmitter oscillator comprises a reflex klystron tuned to operate at X-band frequencies. This involves the use of a stabilizing circuit for the klystron which is unnecessary if a Gunn oscillator is used. In all other respects the apparatus using a klystron oscillator transmitter is the same as that described above and using a Gunn oscillator.

Although the invention has been described with reference to a burglar alarm form of intruder detector, it will be appreciated that the apparatus may be used for other purposes, for example, to indicate whether vehicles travelling on a motorway have speeds above or below a threshold value. The threshold value is determined by the Doppler frequencies which are transmitted through the upper and lower band-pass filters. By suitably selecting the components of these filters different Doppler frequencies may be provided. In this way, vehicles travelling down a motorway and exceeding the speed limit will provide an immediate indication to trigger an alarm or equipment for photographing the vehicle. It will therefore be understood that the invention has wider application than in the mere provision of an intruder detector, and may be used anywhere where an indication of a relative velocity of a moving object is required, the object travelling along a specific path covered by the beam of radiation and at a range of up to a quarter of a mile at the most, and preferably of the order of 50 yards.

I claim:

1. Intruder detecting apparatus comprising a microwave transmitter having an oscillator, a microwave launching aerial coupled to said transmitter oscillator and shaped to provide a radiation screen and having a launching aperture; a microwave receiver aerial separate from said launching aerial and having an aperture separate from the launching aerial aperture and adapted to receive reflected transmitter radiation; a diode mixer in said receiver aerial and on which reflected radiation is incident; means coupling microwave energy directly from inside said transmitter aerial to the receiver aerial without reflection, said means terminating in said receiver aerial adjacent to the diode to maintain it in a pumped condition so that it behaves as a combined mixer and detector for incoming radiation at different frequencies; a band-pass amplifier connected to receive the diode output and passing only a preselected range of Doppler frequencies; and circuitry connected to the amplifier and providing signals respectively signifying the presence and absence of Doppler frequencies within the selected range.

2. Apparatus as set forth in claim 1, in which the transmitter and the receiver aerials respectively comprise separate microwave horns, and said microwave energy aerial coupling means comprises a coaxial cable having a core with opposite ends extending respectively one into each of said horns.

3. Apparatus as set forth in claim 1, mounted inside an electrically conductive casing divided internally by an electrically conductive partition into two campartments one of which contains integrally made horn aerials of the transmitter and the receiver, and the other of which contains electronic circuitry which is mounted on a removable front cover integrally made with the horn aerials.

4. Apparatus as set forth in claim 1 using a Gunn oscillator for generating electromagnetic radiation.

5. Electronic apparatus for detecting movement by Doppler effect, comprising: a casing; a microwave launching horn built into said casing and having a launching aperture; a microwave receiving horn built into said casing and having its aperture pointing in the same direction but separate from the aperture of said launching horn; means coupling microwave energy directly from inside said launching horn to the inside of said receiving horn; a partition dividing said casing into two compartments one of which contains said horns; and X-band transmitter oscillator mounted in the second compartment; a quarter-wave stub in said launching horn; coupling means feeding electromagnetic energy from said transmitter oscillator into said quarter-wave stub; mixer diode means mounted in said receiver horn and maintained in conduction by electromagnetic energy transmitted through said horn coupling means; band-pass amplification means mounted in said second compartment and providing an output signal consisting of a preselected range of received Doppler frequencies; an integrator circuit providing an output if said Doppler frequencies are maintained for longer than a preset period; and alarm generating means triggered by said integrator output on the Doppler frequency duration exceeding said preset period.

6. Apparatus as set forth in claim 5, in which said band-pass amplification means includes a high gain degenerative amplifier receiving the diode output by way of a low pass filter, and transmitting the Doppler frequencies to the integrator by way of a high pass filter, said two filters defining said Doppler range.

7. Electronic apparatus as set forth in claim 5, in which said band-pass amplification means includes a degenerative feedback high gain amplifier and said horn coupling means comprises a coaxial cable having an intermediate portion looped into said second compartment.

8. Apparatus as set forth in claim 5, in which said casing is made from two aluminium castings, one casting being integrally formed with said horns and said partition, and the electronic equipment of said apparatus being mounted on said front cover.

9. Apparatus comprising an X-band transmitter oscillator; a microwave launching horn aerial receiving electromagnetic radiation from said transmitter oscillator and having an aperture shaped to beam the radiation in a desired direction with a desired pattern; an X-band receiver horn aerial having an aperture separate from said launching horn aerial aperture and mounted beside it to view the direction of the transmitted beam and to receive radiation reflected from objects intercepting the beam; a diode mixer in said receiver aerial and on which reflected radiation is incident; means coupling microwave energy directly from inside the transmitter aerial to the inside of said receiver aerial to maintain said diode in a pumped condition at which it behaves as a combined mixer and detector for incoming radiation at different frequencies; a band-pass amplifier connected to receive the diode output and transmitting only desired Doppler frequencies in said output; and circuitry connected to the amplifier output and responding to the presence of said desired Doppler frequencies by signifying the presence in the radiated beam of a moving object to which the apparatus is set to respond.

References Cited

UNITED STATES PATENTS

| | | | |
|---|---|---|---|
| 3,423,753 | 1/1969 | Preti | 343—8 |
| 2,805,335 | 9/1957 | Kendall et al. | 343—8 XR |
| 2,859,435 | 11/1958 | Auer et al. | 343—8 |
| 3,181,151 | 4/1965 | Clouser | 343—8 |
| 3,187,329 | 6/1965 | Midlock | 343—8 |
| 3,383,678 | 5/1968 | Palmer. | |

RICHARD A. FARLEY, Primary Examiner

M. F. HUBLER, Assistant Examiner

U.S. Cl. X.R.

340—258